US006931743B1

(12) United States Patent
Scarborough

(10) Patent No.: US 6,931,743 B1
(45) Date of Patent: Aug. 23, 2005

(54) CHALK LINE WITH SELECTIVELY ADJUSTABLE TIP

(75) Inventor: Dane Scarborough, Hailey, ID (US)

(73) Assignee: Irwin Industrial Tool Company, Huntersville, NC (US)

(*) Notice: Subject to any disclaimer, the term of this patent is extended or adjusted under 35 U.S.C. 154(b) by 0 days.

(21) Appl. No.: 10/785,580

(22) Filed: Feb. 23, 2004

(51) Int. Cl.[7] .............................. B44D 3/38; G01B 3/10
(52) U.S. Cl. .............................. 33/414; 33/755; 33/756; 33/758; 33/770
(58) Field of Search .......................... 33/414, 755–756, 33/758, 770

(56) References Cited

U.S. PATENT DOCUMENTS

| | | | | |
|---|---|---|---|---|
| 3,662,471 | A * | 5/1972 | Lynde | 33/770 |
| 4,565,011 | A * | 1/1986 | Karger | 33/414 |
| 4,765,557 | A * | 8/1988 | Kahmann | 33/414 |
| 4,932,135 | A * | 6/1990 | Wobser, II | 33/408 |
| 4,995,152 | A * | 2/1991 | Steckler | 33/409 |
| 5,408,757 | A * | 4/1995 | Lenz | 33/647 |
| 5,509,616 | A * | 4/1996 | Millen et al. | 33/414 |
| 5,519,976 | A * | 5/1996 | Gee | 52/712 |
| 5,600,894 | A * | 2/1997 | Blackman et al. | 33/758 |
| 5,873,174 | A * | 2/1999 | Kraft | 33/758 |
| 5,937,532 | A * | 8/1999 | Eirich et al. | 33/758 |
| 6,082,014 | A * | 7/2000 | Beyers | 33/414 |
| 6,295,739 | B1 * | 10/2001 | Kraft | 33/758 |
| 6,415,519 | B1 * | 7/2002 | Bennett | 33/414 |
| 6,622,396 | B2 * | 9/2003 | Salazar | 33/758 |
| 6,698,679 | B1 * | 3/2004 | Critelli et al. | 33/758 |
| 6,705,018 | B2 * | 3/2004 | Guhse | 33/414 |
| 6,745,485 | B2 * | 6/2004 | Shor | 33/414 |
| 2002/0026723 | A1 * | 3/2002 | Savalla | 33/414 |

* cited by examiner

*Primary Examiner*—Christopher W. Fulton
*Assistant Examiner*—Yaritza Guadalupe
(74) *Attorney, Agent, or Firm*—Stephen M. Nipper; Dykas, Shaver, Nipper

(57) ABSTRACT

An improved chalk line tip for a chalk-line. The tip having a string attachment portion, having a first end configured to receive a pivot pin therein and extending in a generally arcuately shaped configuration toward a second end, which is also configured to receive a pivot pin therein. The string connection body defining an aperture dimensioned to allow passage of a portion of the attachment portion therethrough. A surface attachment portion having various devices for attaching the surface attachment portion to a surface to be marked. The tip is configured to allow various configurations of the attachment device to be presented and attached to a surface to be marked thus allowing for increased applicability and utility upon a variety of surfaces.

21 Claims, 4 Drawing Sheets

CHALK LINE WITH SELECTIVELY ADJUSTABLE TIP

BACKGROUND OF THE INVENTION

1. Field of the Invention

The present invention generally relates to the field of carpentry and construction trades, and more particularly relates to a chalk line marking devices, which enable a skilled tradesman such as a carpenter to simply, easily, and effectively mark straight work lines quickly and accurately upon a variety of surfaces.

2. Background Information

In the building construction industry, it is often necessary to provide a straight line as a guide for performing tasks such as cutting large pieces of material like sheetrock or plywood, nailing down flooring over floor joists, placing shingles upon a roof or laying flooring over a surface. One of the most common ways in which a straight line is marked in these situations is with a chalkline.

A chalk line is typically a string connected to a reel, which is held within a housing. This reel winds the string and is typically configured to allow the string to be pulled off of the reel and then rewound back on to the reel. The string is coated with chalk dust that is usually poured into the housing and applied to the string as the string is pulled out of and then retracted back into the housing upon the reel.

To use a chalk line to mark a line for a desired purpose, the line is unwound from within the reel and stretched between two marked points. A part of the chalk line somewhere between the two points is then raised and released quickly. This action called snapping. When the chalk line is snapped, the chalk from the line is deposited upon the surface. The string can then be rewound and a temporary line remains upon the surface. This line can then be utilized as a guide in performing the desired actions.

In order for the chalk line to mark an appropriate line, the two ends of the line must be fixed in their respective locations so as to anchor the line while tension is applied. If one of the anchor ends is not firmly positioned, the chalk will not deposit upon a straight line and a number of undesirable consequences may result. This includes smearing of the chalk upon the device, errant lines, and other problems. While a variety of features for these devices have been created, devices for chalk lines have been created. The major draw backs of these inventions is that depending upon the circumstances a carpenter may not be able to appropriately anchor a distant end of the chalk line. As a result, he cannot always hold the chalk line in the desired position, stretch the chalk line, and snap the chalk line.

A chalk line is a tool that may be used in a variety of circumstances. Therefore, the matter of anchoring the chalk line may not always be the same for all circumstances. For example, in some instances, such as rough carpentry, a nail can be driven at one point and the chalk line then tied or otherwise fastened to the nail, the string can then be stretched and snapped. However, in other instances the placement of a nail is not always desired. In such an instance, a grasping device may be desired to simply grasp the edge of the surface upon which the mark is to be made. One way that seems to work in nearly all situations is to simply call another individual over to hold the distant end of the chalk line at the desired position. This method however, is time consuming, inefficient and in instances where a carpenter or framer is working alone, simply impossible.

There does not exist, to the knowledge of the applicant, an anchor for a chalk line device that will allow the user to variously select different types of attachment means to anchor a distant end of a chalk line. Accordingly, it is an object of the present invention to provide an anchor for a chalk line with provides various means of anchoring the chalk line to a surface to be marked. Furthermore, an additional object of the invention is to provide an anchor for a chalk line that can be selectively utilized to vary the position or the type of attachment device to be used, according to the needs of the user. Another object of the present invention is to provide a chalk line with a novel anchoring device, which can be used on a variety of different types of surfaces according to the necessities and needs of a user. Various embodiments of the present invention satisfy these and other needs.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The preferred embodiment of the present invention is a chalk line with a variably selectable anchor configured to allow a user to attach the anchor of the chalkline to a variety of surfaces utilizing a variety of connection tools. The chalkline itself is comprised of a string having one end attached to a reel and the other end attached to a variably selectable anchor. The variably selectable anchor has a string attachment portion configured to connect the anchor with a string. The string attachment portion has a first end configured to receive a pivot pin therein, and extends in a generally, arcuately, shaped configuration toward a string attachment portion second end. The string attachment portion second end is also configured to receive a pivot pin therethrough. The string connection body defines an aperture dimensioned to allow the passage of a portion of a surface attachment device therethrough. The surface attachment portion has a body with a first end, configured to form a clip. This clip having a plurality of teeth and also being configured to grasp an edge of a surface. The surface attachment body portion also defines an aperture. This aperture is configured to receive a portion of a surface projection therethrough. The surface attachment body portion further defines the passageway configured to allow passage of a pivot pin therethrough. The surface attachment body portion also extends to a second end. This second end forming a projection configured for insertion within a surface. A pivot pin holds the string connection portion and the surface connection portions together in a pivotable arrangement. This configuration allows these two portions to pivot about one another and allows the string to be held in a desired position while varying the surface attachment portion so as to allow the device to be anchored in a variety of differing positions upon a variety of differing surfaces.

Further, the purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection the general nature and essence of the technical disclosure of the application. The Abstract is neither intended to define the invention of the application, which is measure by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
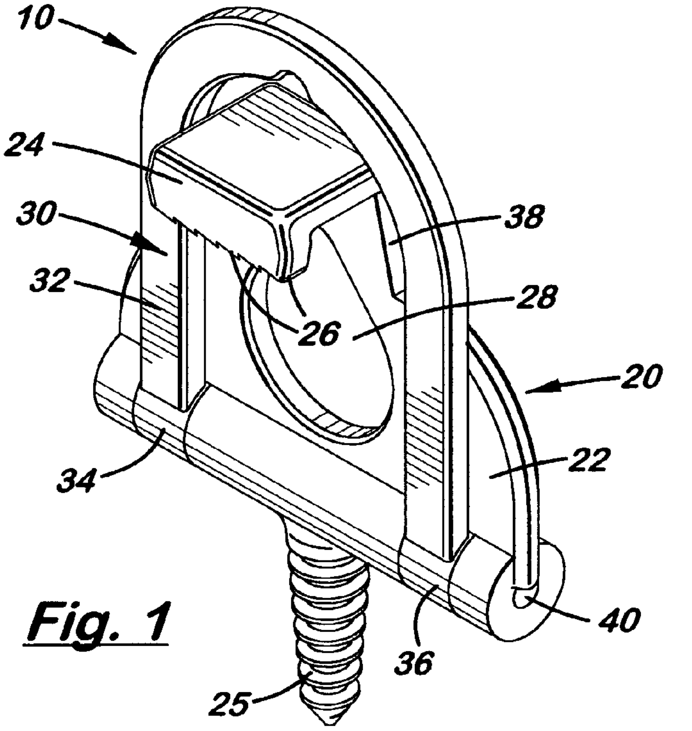
FIG. 1 is a perspective view of the preferred embodiment of the invention in a first attachment position.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is an attachment device that is configured to anchor one end of a chalk line. The preferred embodiment of this invention is shown in FIGS. 1–8, and will be described hereinafter as follows, while a preferred embodiment of the invention is shown and described it is to be distinctly understood that the present invention is not limited thereto but may be variously embodied and described.

FIG. 1 shows the preferred embodiment of the present invention 10 in a first orientation. This invention comprises a surface attachment portion 20 and a string connection portion 30. The string connection portion comprises a body 32 that extends from a first end 34 to a second end 36 along a preferably genuinely arcuately shaped body 32. Other shapes are likewise envisioned. In this embodiment, the string portion connection first end 34 and the string connection portion second end 36 are each hollow thus allowing placement of a pivot pin 40 therethrough. The arcuately shaped string connection portion body 32 defines a passageway 38 therethrough, which is further configured to allow a portion of the attachment device 20 to pass therethrough when rotated about the pivot pin 40.

The present invention comprises at least one surface attachment portion. The surface attachment portion 20 in the preferred embodiment is comprised of a surface attachment portion body 22, having the first end 24 configured like a clip and a second end configured as a threaded projection 25 or screw. In this embodiment, the projection 25 is a threaded projection. However, it is to be understood that the invention is not limited thereto and that the projection 25 may be any of a variety of types of projections that are configured to be inserted within a portion of a surface to be marked, including but not limited to spikes, brads, nails, bolts, tacks, etc.

In this embodiment, the surface attachment portion comprises three separate surface attachments (a clip portion, a threaded portion, and an aperture (discussed infra)). It is expressly envisioned that the surface attachment portion may comprise any number of surface attachments and that the surface attachments may be integral to one another or separate and independent of one another.

The first end 24 of the surface attachment body portion 22 is configured to clip and/or attach to the edge of a surface or other surface portion (including but not limited to exposed fasteners, etc.). This clip 24 preferably having a plurality of teeth 26 that are configured to assist the clip 24 in grasping the edge or another portion of the surface to be marked. It is preferred that this clip be generally U-shaped, however L-shaped and other shaped clips are also possible.

The body of the surface attachment portion 22 preferably also defining an aperture 28 which is configured for placement around a surface projection. An example of such a projection would be a nail, screw, fastener, or other feature that extends from the surface that is to be marked. Other manners of surface projection attachment are also possible (other than an aperture), including but not limited to hooks, loops, flanges, etc.

Figure 2:
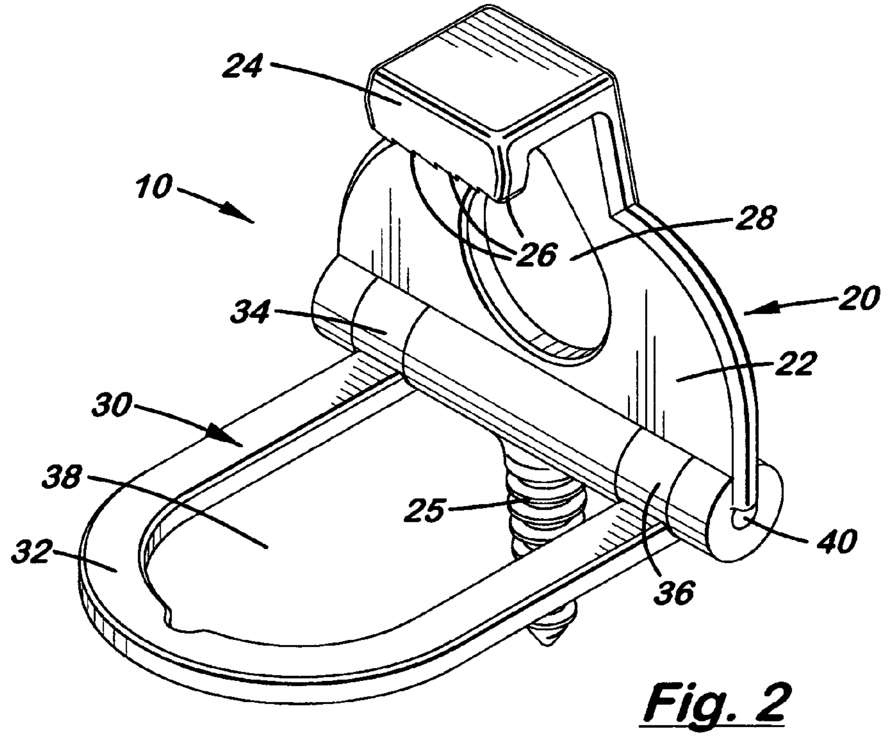
FIG. 2 is a perspective view of the present invention in a second attachment position.
Figure 3:
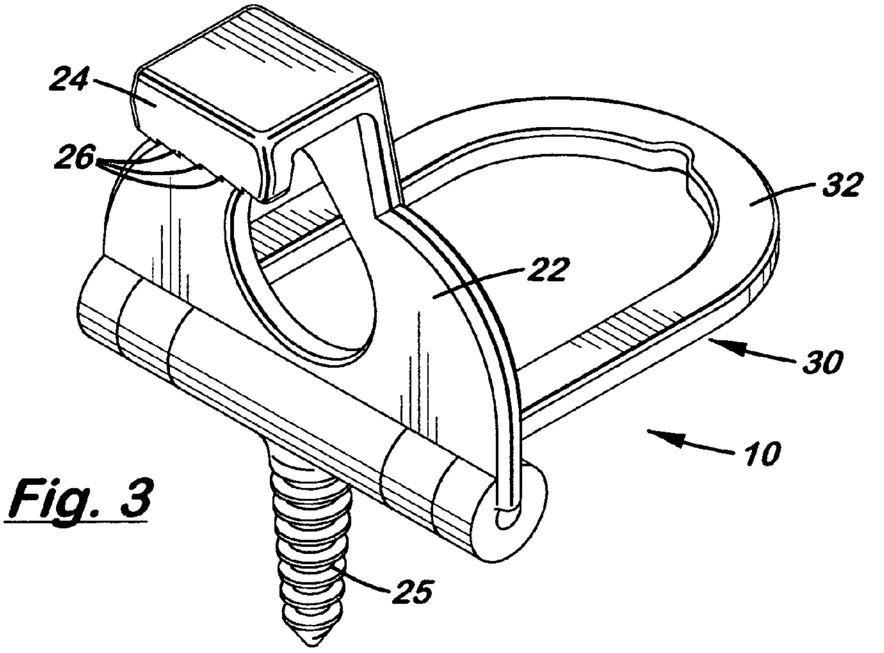
FIG. 3 is a rear perspective view of the embodiment shown in FIG. 2.
Figure 4:
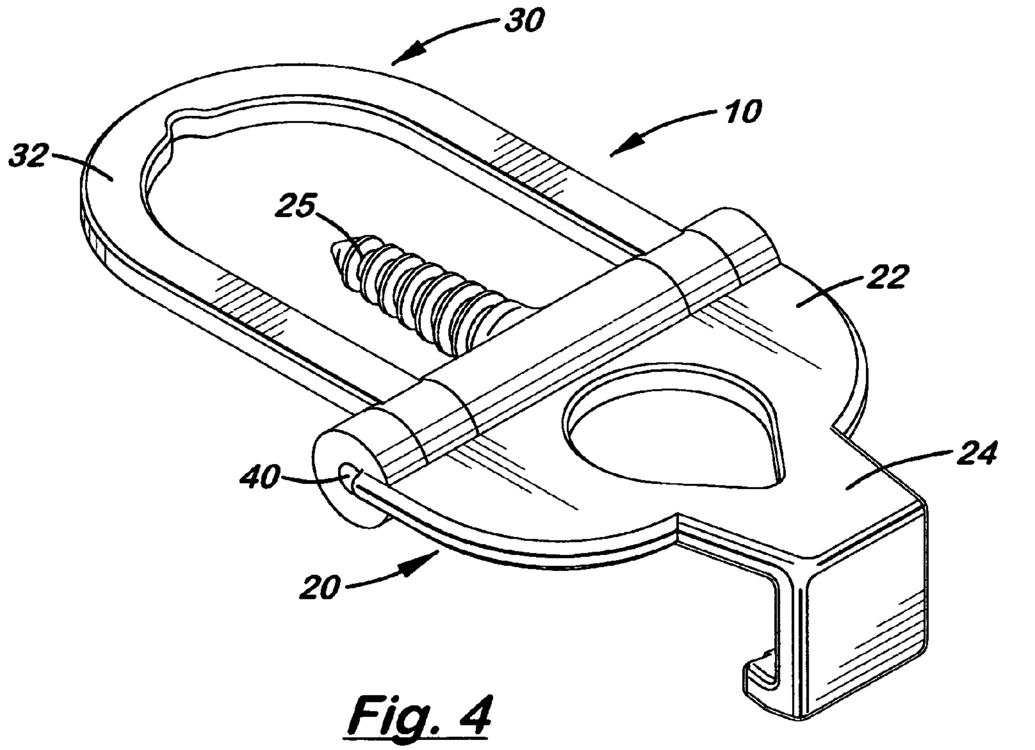
FIG. 4 is a perspective view of the preferred embodiment of the invention in its third attachment position.

The surface attachment portion body 22 preferably also defines a passageway that allows passage of a pivot pin 40 through the surface attachment connection portion 20 as well as the string attachment portion 30 of the device. This pivot pin 40 allows the string connection portion 30 and the surface attachment portion 20 to be variously rotated relative to one another, as is shown in FIGS. 2, 3, and 4, and specifically in FIG. 8, so as to allow for the various orientations and configurations shown herein. By allowing for various orientations and configurations, a user has a plurality of different options as it relates to the attachment of the tip/hook/clip of the chalk line to the surface to be marked.

Figure 5:
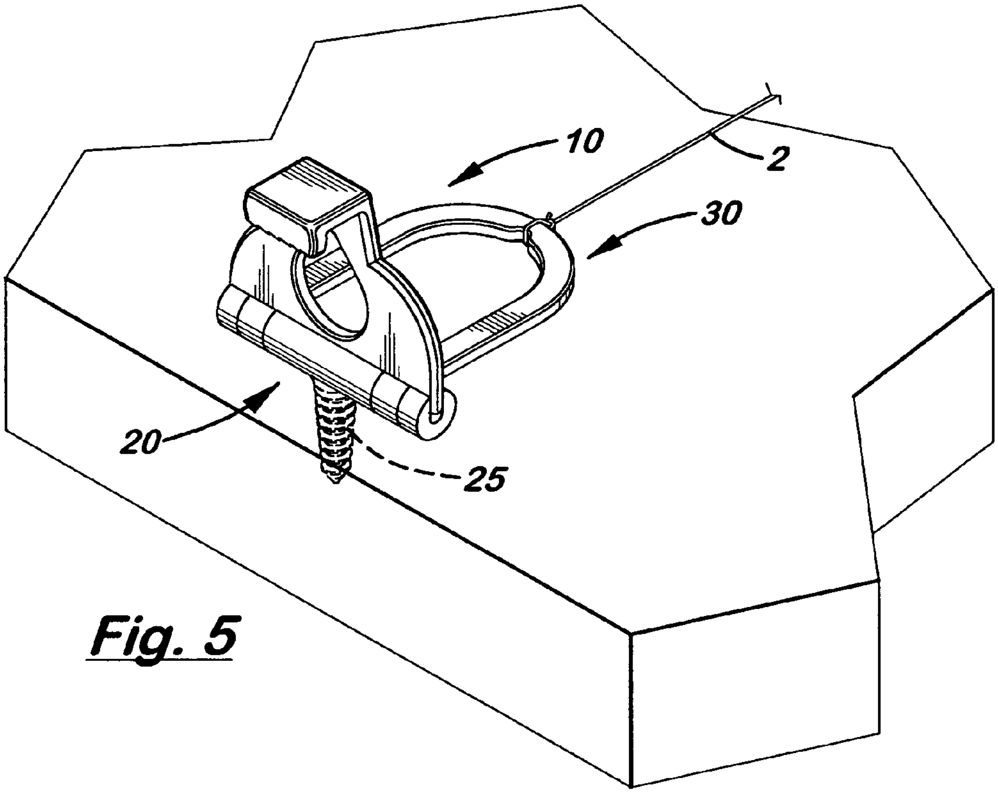
FIG. 5 is a perspective view of the present invention its second orientation in use upon a surface.

FIG. 2 shows the invention of FIG. 1 in a first orientation. In this first orientation, the string attachment portion 30 has been rotated about pivot pin 40 so as to provide 90 degrees of separation between the clip portion 24 and the body 32 of the string connection portion. In such a configuration, the threaded projection portion 25 is positioned so as to allow the connection device 10 to be anchored within a surface. An example of this configuration is shown in FIG. 5. Typically, the orientations of FIG. 2 and FIG. 3 are generally interchangeable. FIG. 3 is another view of the embodiment shown in FIG. 2, with the string connection rotated 180 degrees.

Figure 6:
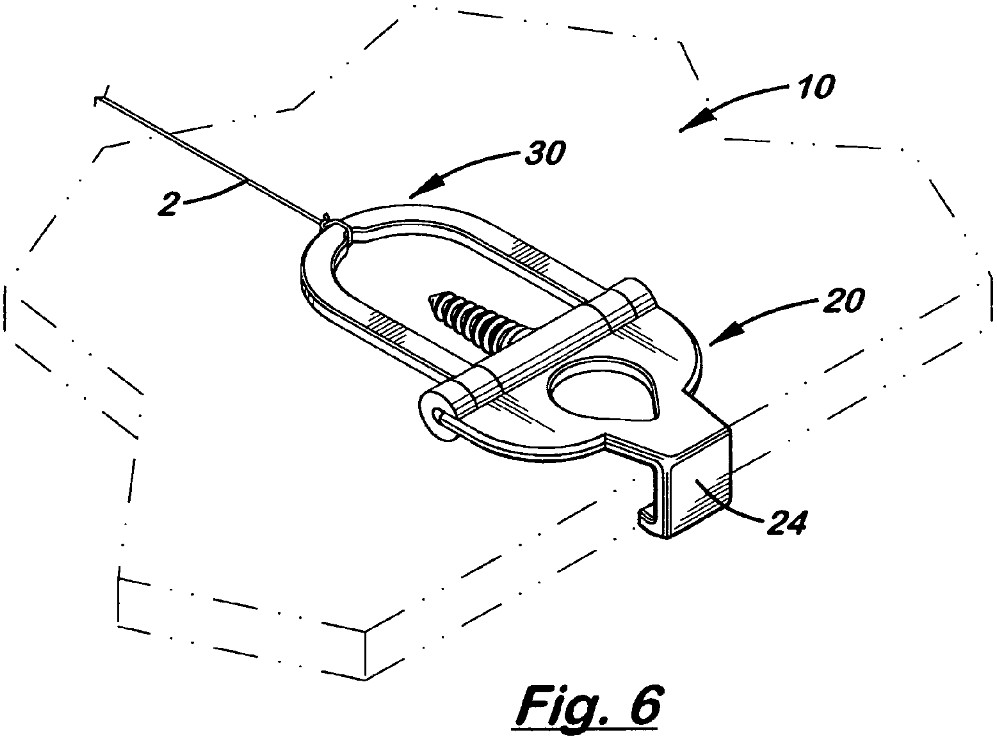
FIG. 6 is a view of the present invention in its third orientation in use upon a surface.

FIG. 4 is the preferred embodiment shown in FIGS. 1, 2, and 3 in a third orientation. In this third orientation, the string connection portion body 32 lies generally 180 degrees from the position of the clip 24. In this orientation, the clip portion 24 is configured for placement around an edge of a surface to be marked as is shown in FIG. 6. In this orientation, the chalk line string 2, shown in FIG. 6, is anchored and can be used to mark a surface.

FIGS. 5 and 6 have been referred to previously and demonstrate the use of the present invention in its various embodiments in use, and show attachment of a string 2 to the device. While the string is shown tied directly to the device, obviously the string could be alternatively tied, for instance with a swivel or other attachment, to the device.

Figure 7:
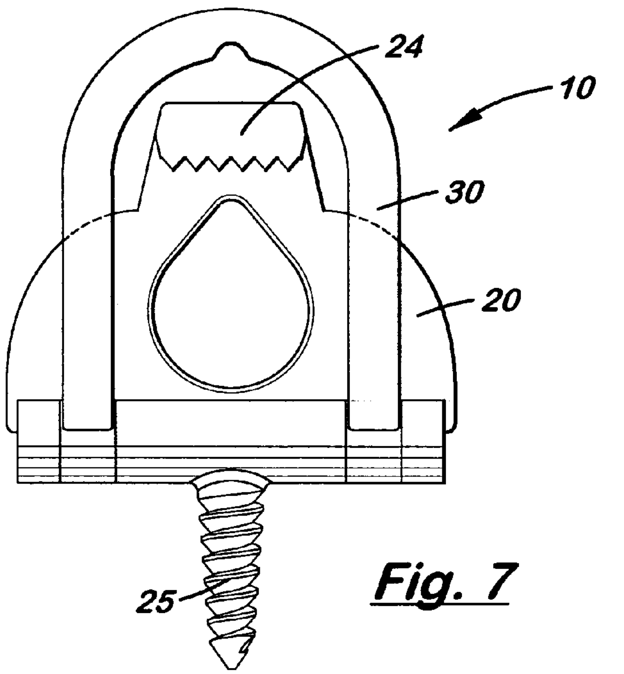
FIG. 7 is a front plain view of the embodiment shown in FIG. 1.
Figure 8:
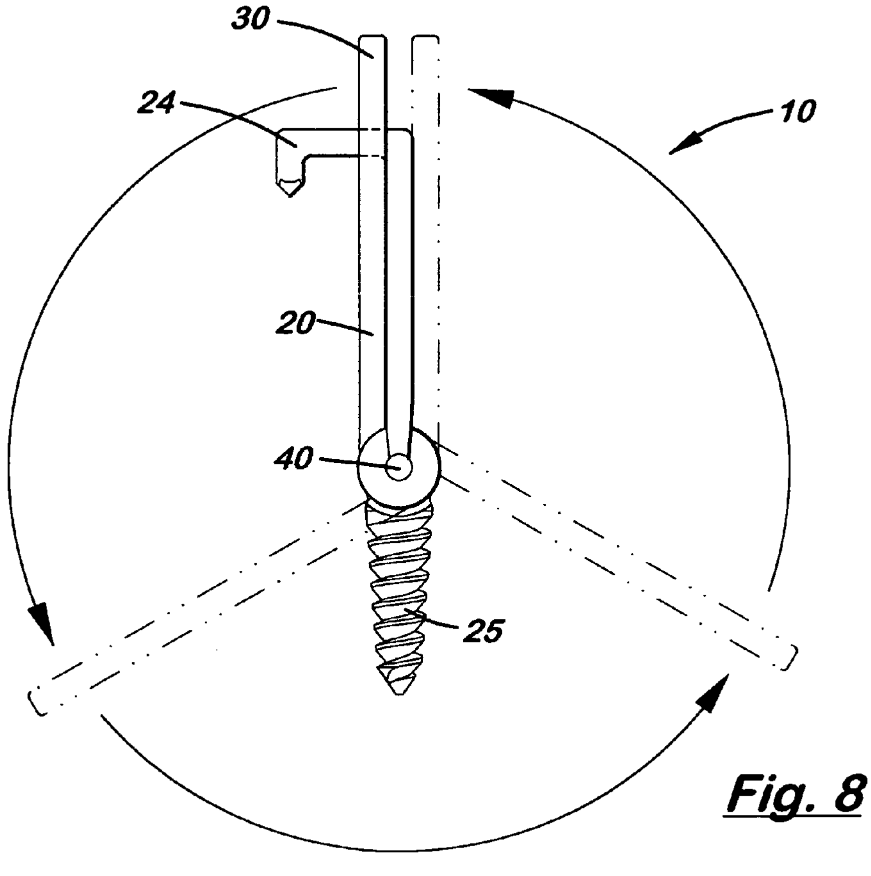
FIG. 8 is a side view of the embodiment shown in FIG. 7 further demonstrating the ability of the string attachment portion and the surface attachment portion to rotate about one another.

FIG. 7 is the front view of the embodiment shown in FIG. 1. FIG. 8 shows the rotation of the string connection portion 30 about the pivot pin 40, thus, varying the orientation between the string connection portion 30 and the attachment portion 20.

In use, the present invention being configured for use with a standard chalk-line, either as a new or replacement chalk-line tip or as a chalk-line device as a whole. Such a device comprising a string having a first end connected to a reel and a second end connected to an attachment device. This reel configured to wind and unwind the string. The attachment device comprised of a string connection portion and a surface attachment portion. The surface attachment portion having at least two variable connection devices each variable connection device configured to connect the attachment device to a surface.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A chalk-line for marking lines comprising:

a string having a first end connected to a reel and a second end connected to an attachment device, said reel configured to wind and unwind said string;

said attachment device comprising a string connection portion pivotally connected to a surface attachment portion, said surface attachment portion having at least two variable connection devices fixed relative to one another, each variable connection device configured to connect said attachment device to a surface, said string connection portion further comprising a string connection body defining an aperture dimensioned to allow passage of a portion of said surface attachment portion therein.

2. The chalk-line of claim 1, wherein at least one of said variable connection devices comprise a clip configured to grasp an edge of a surface.

3. The chalk-line of claim 1, wherein at least one of said variable connection devices comprises comprise a body defining an aperture, said aperture configured to engage a portion of a surface projection.

4. The chalk-line of claim 1, wherein at least one of said variable connection devices comprise a projection, said projection configured to puncture a surface and to hold said attachment device in engagement with said surface.

5. The chalk-line of claim 4, wherein said projection is threaded and configured to be screwed into said surface.

6. The chalk-line of claim 1, wherein said string connection portion has a string connection portion body, said string connection portion body being generally arcuately shaped, having a first end to a second end, said first end and said second end configured to receive a pivot pin therein.

7. The chalk-line of claim 1, wherein said attachment portion comprises an attachment portion body, said attachment portion body comprising a first end configured to form a clip, said clip configured to grasp an edge of a surface, said attachment portion body defining an aperture, said aperture configured to receive a portion of a surface projection therein; said attachment portion body further defining a passageway configured to allow passage of a pivot pin therethrough, said attachment portion body extending to a second end, said second end configured to form a threaded projection said threaded projection configured to allow insertion of said threaded projection within a surface.

8. The chalk-line of claim 7, wherein said attachment portion is pivotally connected to said string connection portion.

9. A adjustable chalk-line hook comprising:

a selectable surface attachment portion, said selectable surface attachment portion configured to provide at least three means for connecting said surface attachment portion to a surface, wherein said surface attachment portion comprises a threaded projection said projection configured to be inserted and held within a surface and to hold said attachment device to said surface; and a string attachment portion configured to connect said string to said surface attachment portion said string attachment device configured to connect said string attachment portion to said surface attachment portion.

10. The hook of claim 9, wherein said string attachment portion is pivotingly connected to said surface attachment portion.

11. The hook of claim 9, wherein said surface attachment portion comprises a clip configured to grasp an edge of a surface.

12. The hook of claim 9, wherein said surface attachment portion comprises a body defining an aperture, said aperture configured to engage a portion of a projection connected to a surface.

13. The hook of claim 9, wherein said string attachment portion has a string connection portion body, said string connection portion body having a first end configured to receive a pivot pin therein and extending in a generally arcuately shaped configuration toward a second end said second end also configured to receive a pivot pin therein, said string connection body defining an aperture dimensioned to receive a portion of said attachment portion therein.

14. The hook of claim 9, wherein said attachment portion comprises an attachment portion body, said attachment portion body comprising a first end configured to form a clip, said clip having a plurality of teeth and configured to grasp an edge of a surface, said attachment portion body defining an aperture, said aperture configured to receive a portion of a surface projection therein; said attachment portion body further defining a passageway configured to allow passage of a pivot pin there through, said attachment portion body extending to a second end, said second end configured to form a threaded projection said threaded projection configured to allow insertion of said threaded projection within a surface.

15. The hook of claim 14, wherein said surface attachment portion is pivotally connected to said string connection portion.

16. An attachment device for a chalk-line comprising:

a string attachment portion, said string connection portion having a string connection portion body, said string connection portion body having a first end configured to receive a pivot pin therein and extending in a generally arcuately shaped configuration toward a second end, said second end also configured to receive a pivot pin therein, said string connection body defining an aperture dimensioned to allow passage of a portion of said attachment portion therethrough;

a surface attachment portion, said surface attachment portion having a body comprising a first end configured to form a clip, said clip having a plurality of teeth and configured to grasp an edge of a surface, said attachment portion body defining an aperture, said aperture configured to receive a portion of a surface projection therein; said attachment portion body further defining a passageway configured to allow passage of a pivot pin there through, said attachment portion body extending to a second end, said second end configured to form a threaded projection said threaded projection configured to allow insertion of said threaded projection within a surface; and said pivot pin configured for insertion within portions of said string attachment portion body and said surface attachment portion body said pivot pin configured to allow rotational movement of said string attachment portion and said surface attachment portions around said pivot pin.

17. A chalk-line for marking lines comprising:

a string having a first end connected to a reel and a second end connected to an attachment device, said reel configured to wind and unwind said string; and an attachment device comprising a string connection portion and a surface attachment portion, said surface attachment portion having at least two variable connection devices, each variable connection device configured to connect said attachment device to a surface, wherein at least one of said variable connection devices comprises a threaded projection configured to be screwed into said surface thereby holding said attachment device in engagement with said surface.

18. A chalk-line for marking lines comprising:

a string having a first end connected to a reel and a second end connected to an attachment device, said reel configured to wind and unwind said string; and an attachment device comprising a string connection portion and a surface attachment portion, said surface attachment portion having at least two variable connection devices, each variable connection device configured to connect said attachment device to a surface;

wherein said surface attachment portion comprises an attachment portion body, said attachment portion body comprising a first end configured to form a clip, said clip configured to grasp an edge of a surface, said attachment portion body defining an aperture, said aperture configured to receive a portion of a surface projection therein, said attachment portion body further defining a passageway configured to allow passage of a pivot pin there through, said attachment portion body extending to a second end, said second end configured to form a threaded projection said threaded projection configured to allow insertion of said threaded projection within a surface.

19. The chalk-line of claim 18, wherein said surface attachment portion is pivotally connected to said string connection portion.

20. A adjustable chalk-line hook comprising:

a selectable surface attachment portion, said selectable surface attachment portion configured to provide at least three variable connection devices for connecting said surface attachment portion to a surface; and a string attachment portion configured to connect said string to said surface attachment portion, said string attachment device configured to connect said string attachment portion to said surface attachment portion;

wherein said surface attachment portion comprises an attachment portion body, said attachment portion body comprising a first end configured to form a clip, said clip having a plurality of teeth and configured to grasp an edge of a surface, said attachment portion body defining an aperture, said aperture configured to receive a portion of a surface projection therein; said attachment portion body further defining a passageway configured to allow passage of a pivot pin there through, said attachment portion body extending to a second end, said second end configured to form a threaded projection said threaded projection configured to allow insertion of said threaded projection within a surface.

21. The hook of claim 20, wherein said attachment portion is pivotally connected to said string connection portion.

* * * * *